US012643266B2

(12) United States Patent
Takada et al.

(10) Patent No.: US 12,643,266 B2
(45) Date of Patent: Jun. 2, 2026

(54) SUBSTRATE PROCESSING APPARATUS, SUBSTRATE PROCESSING METHOD, AND ARTICLE MANUFACTURING METHOD

(71) Applicant: CANON KABUSHIKI KAISHA, Tokyo (JP)

(72) Inventors: Hiroki Takada, Saitama (JP); Ken-Ichiro Shinoda, Tochigi (JP); Osamu Yasunobe, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/753,192

(22) Filed: Jun. 25, 2024

(65) Prior Publication Data

US 2024/0342965 A1      Oct. 17, 2024

Related U.S. Application Data

(63) Continuation of application No. 17/735,201, filed on May 3, 2022, now Pat. No. 12,226,936.

(30) Foreign Application Priority Data

May 13, 2021     (JP) ................................. 2021-081858

(51) Int. Cl.
B29C 35/08 (2006.01)
B29C 35/02 (2006.01)
(Continued)

(52) U.S. Cl.
CPC ...... B29C 35/0288 (2013.01); B29C 35/0805 (2013.01); B29C 41/20 (2013.01);
(Continued)

(58) Field of Classification Search
CPC ............ B29C 2035/0827; B29C 33/42; B29C 35/0288; B29C 35/0805; B29C 41/20;
(Continued)

(56) References Cited

U.S. PATENT DOCUMENTS 5,352,326  A      10/1994   Cywar et al.
8,394,282  B2     3/2013    Panga et al.
(Continued)

FOREIGN PATENT DOCUMENTS

JP        2004342633  A      12/2004
JP        2011529626  A      12/2011
(Continued)

OTHER PUBLICATIONS

Notice of Allowance issued in U.S. Appl. No. 17/735,201 mailed Oct. 30, 2024.
(Continued)

*Primary Examiner* — Philip C Tucker
*Assistant Examiner* — Jimmy R Smith, Jr.
(74) *Attorney, Agent, or Firm* — ROSSI, KIMMS & McDOWELL LLP

(57) ABSTRACT

A substrate processing apparatus that can radiate light on a composition in an optimum radiation amount based on acquired spectral sensitivity characteristics can be provided. A substrate processing apparatus configured to perform pattern formation processing on a composition on a substrate includes a first radiation unit configured to radiate first light onto the substrate, a dispenser configured to apply the composition to a first position inside the substrate processing apparatus, a template holding unit configured to hold a template to be brought in contact with the composition on the substrate, and a controller configured to control a radiation amount of the first light to be radiated by the first radiation unit based on spectral sensitivity characteristics of the composition that are measured in advance.

13 Claims, 11 Drawing Sheets

(51) Int. Cl.

| | |
|---|---|
| *B29C 41/20* | (2006.01) |
| *B29C 41/46* | (2006.01) |
| *B29C 41/52* | (2006.01) |
| *B29L 31/34* | (2006.01) |

(52) U.S. Cl.
CPC .............. *B29C 41/46* (2013.01); *B29C 41/52* (2013.01); *B29C 2035/0827* (2013.01); *B29L 2031/3425* (2013.01)

(58) Field of Classification Search
CPC ......... B29C 41/46; B29C 41/52; B29C 43/18; B29C 2033/422; B29C 33/424; B29C 2033/426; B29L 2031/3425
See application file for complete search history.

(56) References Cited

U.S. PATENT DOCUMENTS

| | | | |
|---|---|---|---|
| 9,703,187 | B2 | 7/2017 | Ono et al. |
| 10,108,084 | B2 | 10/2018 | Ono et al. |
| 12,226,936 | B2 * | 2/2025 | Takada .................... B29C 33/42 |
| 2002/0101574 | A1 * | 8/2002 | Tsuji ................... G03F 7/70133 |
| | | | 355/71 |
| 2008/0099941 | A1 | 5/2008 | Suehira et al. |
| 2014/0152969 | A1 * | 6/2014 | Bleeker ............... G03F 7/70608 |
| | | | 355/67 |

| | | | |
|---|---|---|---|
| 2014/0210140 | A1 | 7/2014 | Omatsu et al. |
| 2014/0347643 | A1 | 11/2014 | Kotoku et al. |
| 2017/0232645 | A1 * | 8/2017 | Iimura .................. G03F 7/0002 |
| | | | 264/40.1 |

FOREIGN PATENT DOCUMENTS

| | | | |
|---|---|---|---|
| JP | 2012018734 | A | 1/2012 |
| JP | 2014229802 | A | 12/2014 |
| JP | 6660452 | B2 | 3/2020 |
| JP | 2020096143 | A | 6/2020 |
| KR | 1020050038236 | A | 4/2005 |
| KR | 1020080053503 | A | 6/2008 |
| KR | 1020140072152 | A | 6/2014 |
| KR | 1020170095152 | A | 8/2017 |
| KR | 1020180095679 | A | 8/2018 |
| TW | 201502696 | A | 1/2015 |
| TW | 201610562 | A | 3/2016 |

OTHER PUBLICATIONS

Office Action issued in U.S. Appl. No. 17/735,201 mailed Mar. 27, 2024.

Office Action issued in Taiwanese Appln. No. 111114795, dated Jul. 5, 2024. English translation provided.

Office Action issued in Korean Application No. 10-2022-0052609, mailed Nov. 1, 2024. English translation provided.

* cited by examiner

START PROCESSING

CALCULATE AMOUNT OF WAVELENGTH SHIFT AT TEMPERATURE OF LIGHT SOURCE    ~S21

TURN ON LIGHT WITH SET POWER    ~S22

MEASURE TEMPERATURE OF LIGHT SOURCE    ~S23

ESTIMATE WAVELENGTH OF RADIATION LIGHT    ~S24

END PROCESSING

SUBSTRATE PROCESSING APPARATUS, SUBSTRATE PROCESSING METHOD, AND ARTICLE MANUFACTURING METHOD

BACKGROUND OF THE INVENTION

Field of the Invention

The present invention relates to a substrate processing apparatus, a substrate processing method, and an article manufacturing method.

Description of the Related Art

Substrate processing apparatus that process a substrate (wafer) to form a pattern on a composition on the substrate using an imprinting technique have been used in recent years. In addition, Japanese Patent Publication No. 2011-529626 has proposed a apparatus that forms a pattern on a substrate, for example, as a substrate processing apparatus. There is a apparatus with two processing units, for example, as a substrate processing apparatus that uses the imprinting technique.

When processing is performed by the two processing units, first, one processing unit (processing unit A) applies a curable composition (composition) such as an imprinting material on an entire surface of a substrate to be cured with UV light. The substrate onto which the curable composition has been applied by the processing unit A is transported to the other processing unit (processing unit B). After that, the processing unit B brings the curable composition applied onto the substrate in contact with a template (mold) having a planarized surface and convexity/concavity (for imprinting). Then, the curable composition is irradiated with (exposed to) UV light while it is in contact with the template having the planarized surface and convexity/concavity and then cured. After the curing, the template is separated (the mold is released) from the cured film. By going through the processing described above, the pattern (the planarized surface and convexity/concavity) of the template can be formed on the curable composition on the substrate.

As a high-power light source used for the above-described substrate processing apparatus, for example, a mercury lamp has been used mainly for the UV region having a wavelength of about 365 nm. The mercury lamp has the problem of a high running cost because the life thereof is about 500 to 3000 hours and it needs to be periodically replaced.

On the other hand, solid light sources such as LEDs have high light emission efficiency compared to mercury lamps, which brings the feature of power saving, and have a longer life than mercury lamps, and thus a dramatic reduction in running costs can be expected. Japanese Patent Laid-Open No. 2004-342633, for example, has proposed an exposure apparatus that is one of substrate processing apparatus including a solid light source as an exposure light source.

However, in the technique disclosed in Patent Literature 2, it is difficult to control a radiation amount (exposure amount) calculated based on an optimum degree of photopolymerization for various processes. According to Japanese Patent No. 6660452, for example, an illuminance of a light source is determined by calculating an optimum degree of photopolymerization at the peak wavelength of the light source based on spectral sensitivity characteristics of a curable composition. Furthermore, a degree of photopolymerization $PD_0$ is represented by the following formula (1) using an illuminance $I_0$, a radiation (exposure) time $t_0$, and a coefficient k.

[Equation 1]

$$PD_0 = k \times (\sqrt{I_0}) \times t_0 \tag{1}$$

LEDs have peak wavelength variations due to individual differences. Furthermore, high power LED light sources have problems that peak wavelengths shift due to heat generation, deteriorating efficiency in light emission, and the like. For these reasons, light sources have an assumed peak wavelength that is different from an actual exposure wavelength, and thus a degree of photopolymerization of a curable composition has a value deviating from an optimum value.

In addition, because the curable composition used for the above-described substrate processing apparatus is volatile over the passage of time, a film thickness thereof applied onto a substrate changes over time. Spectral sensitivity characteristics of the curable composition are acquired based on a transmission absorption rate, and a changing film thickness causes spectral sensitivity characteristics to change. For this reason, spectral sensitivity characteristics presented by manufacturers that provide curable compositions (manufacturers of resists) sometimes do not match those presented in actual substrate processing processes. Thus, if an amount or a time of light radiation to cure a composition is adjusted or controlled based on the spectral sensitivity characteristics presented by manufacturers of resists, the composition does not reach an expected (optimum) cured state. That is, the target degree of curing of compositions may vary.

SUMMARY OF THE INVENTION

The present invention aims to provide a substrate processing apparatus that can radiate light to a composition in an optimum radiation amount based on acquired spectral sensitivity characteristics.

A substrate processing apparatus of an aspect of the present invention is a substrate processing apparatus configured to perform pattern formation processing on a composition on a substrate, and includes a first radiation unit configured to radiate first light onto the substrate, a dispenser configured to apply the composition to a first position inside the substrate processing apparatus, a template holding unit configured to hold a template to be brought in contact with the composition on the substrate, and a controller configured to control a radiation amount of the first light to be radiated by the first radiation unit based on spectral sensitivity characteristics of the composition that are measured in advance.

Further features of the present invention will become apparent from the following description of exemplary embodiments with reference to the attached drawings.

DESCRIPTION OF THE EMBODIMENTS

Figure 1:
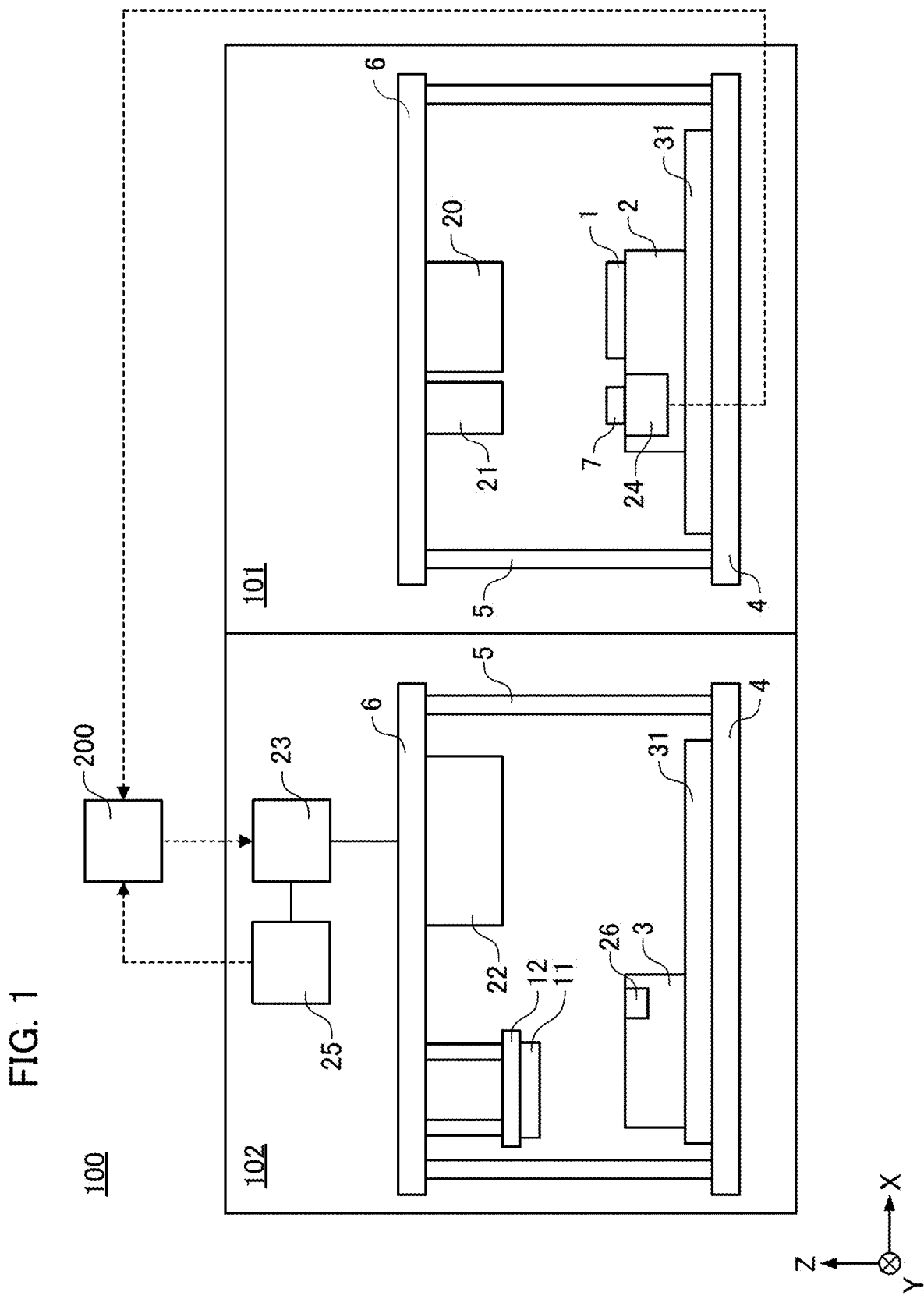
FIG. 1 is a diagram illustrating a configuration of a substrate processing apparatus of a first example.

Exemplary embodiments of the present invention will be described using examples and figures with reference to the accompanying diagrams. Further, in each of the drawings, the same reference numerals are given to the same members and constituent elements, and overlapping description is omitted or simplified.

First Embodiment

A substrate processing apparatus (or processing apparatus) 100 according to a first example will be described below with reference to FIG. 1. FIG. 1 is a diagram exemplifying a configuration of the processing apparatus 100 of the first example. The processing apparatus 100 is configured to perform a pattern formation process on a curable composition (composition) on a substrate 1. In the following description, a direction parallel to the optical axis of light radiated on the composition on the substrate 1 will be defined as a Z axis direction, and two directions orthogonal to each other within a plane perpendicular to the Z axis direction will be defined as an X axis direction and a Y axis direction.

The processing apparatus 100 of the first example may be configured as a planarization processing apparatus that uses a template (mold) 11 to form a planarized film using the composition on the substrate 1, that is, to form a planarized pattern of the composition on the substrate 1. In this case, the composition is cured with the template 11 in contact with the composition. A planarization technique called inkjet-based adaptive planarization (IAP) is applied to the planarization processing apparatus in which, for example, planarized films are collectively formed in multiple pattern formation areas on the substrate 1.

In addition, the processing apparatus 100 may be configured as an imprinting processing apparatus that uses the template 11 having a pattern (a convex-concave pattern) to transfer the pattern of the template 11 to the composition on the substrate 1. In this case, the composition is irradiated with light having a wavelength that can cure the composition to be cured with the pattern of the template 11 in contact with the composition. With the imprinting processing apparatus, for example, the pattern may be formed in each of the multiple pattern formation areas on the substrate 1. Furthermore, the pattern may be formed in two or more pattern formation areas collectively, or in multiple pattern formation areas collectively.

In addition, the processing apparatus 100 may be an exposure apparatus that irradiates the composition with light (exposure light) emitted from the light source and cures it to form the pattern on the cured material, the pattern formed on a reticle (mold) being transferred thereon. The exposure apparatus includes a apparatus that drives a focus sequentially to multiple pattern formation areas (exposure areas), a apparatus that sequentially performs exposure (projection exposure apparatus), and the like.

A representative example in which the processing apparatus 100 is configured as a planarization apparatus will be described below. Further, the processing apparatus 100 may have a configuration similar to that of cases where it is configured as an imprinting apparatus or an exposure apparatus and as a planarization apparatus.

Figure 2A:
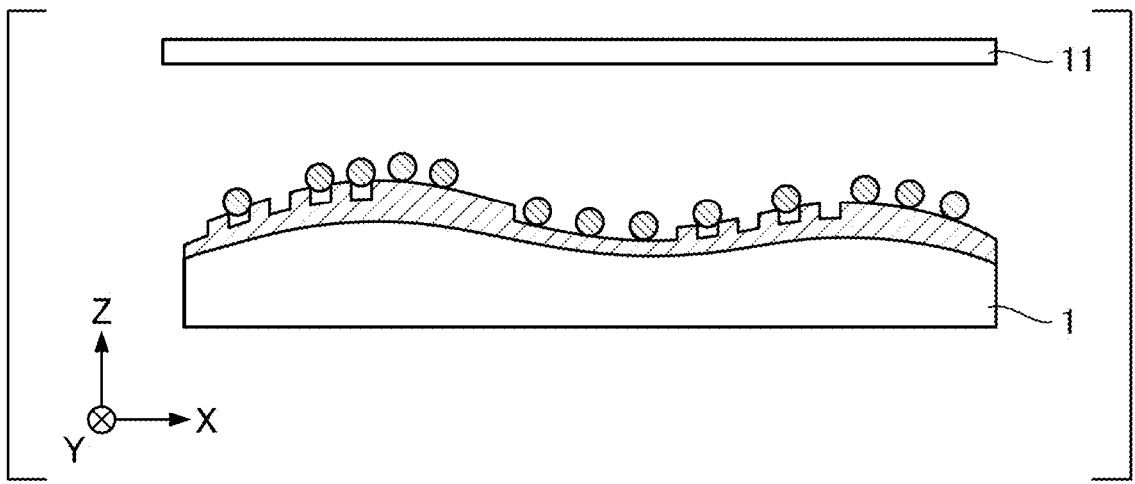
FIGS. 2A to 2C are schematic diagrams for describing a processing method performed by the substrate processing apparatus of the first example.
Figure 2B:
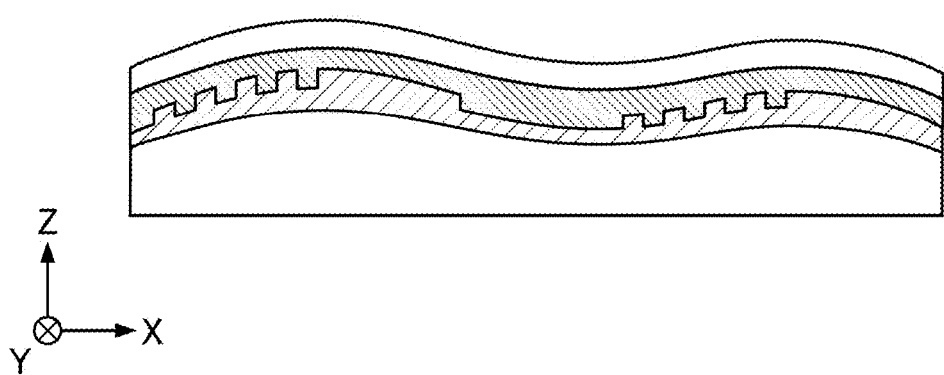
Figure 2C:
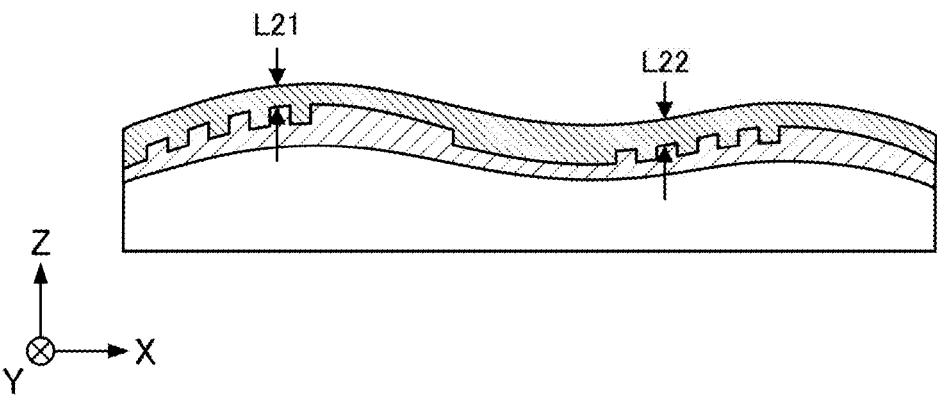

FIG. 2 is a diagram for explaining exemplary processing performed by the processing apparatus (planarization apparatus) 100 according to the first example. FIG. 2A illustrates the state in which a composition has been supplied onto the substrate 1 and the template (flat plate) 11 has not yet been brought in contact with the composition. The pattern in which the composition is supplied is calculated taking convexity-concavity information of the entire surface of the substrate 1 into account. FIG. 2B illustrates the state in which the template 11 has come in contact with the composition on the substrate. FIG. 2C illustrates the state in which the composition has been irradiated with light to be cured and the template 11 has been separated therefrom.

Because the actual substrate 1 has not only the convexity and concavity of the pattern but also the level differences of the pattern on the entire surface, the convexity and concavity affect the template 11 such that it comes in contact with the composition at different timings. Although the composition starts moving at the first contact position immediately after the contact in the first example, a larger amount of composition is disposed according to the degree of movement. In addition, the composition starts moving late at the last contact position and a composition flowing from the surroundings is added, and thus an amount of the composition is reduced according to the degree of the inflow. Due to such measures, a planarized layer having a uniform thickness can be formed on the entire surface of the substrate 1 as indicated by L21 and L22 shown in FIG. 2.

The processing apparatus 100 of the first example includes a processing unit 101 and another processing unit 102 as two processing units (processors). The processing unit 101 performs an application step in which the composition is applied onto the substrate 1. The processing unit 102 performs a step of holding the template 11 (template holding step). Furthermore, it performs a contact step in which the template 11 is brought in contact with the composition on the substrate 1. Furthermore, it performs a radiation step (exposure step) in which the composition is irradiated with light to be cured with the template 11 in contact therewith and further performs a mold release step in which the template 11 is released from the cured composition. It is assumed that the above-described steps are sequentially performed in the pattern formation process.

For the composition, a composition that cures when energy for curing is given (which may be referred to as an uncured resin) is used. Electromagnetic waves, heat, and the like may be used as the energy for curing. The electromagnetic waves are light, for example, infrared light, visible light, ultraviolet light, or the like having a wavelength selected from the range of 10 nm to 1 mm.

The composition is a composition that is cured by light radiation or heating. Among such compositions, a photocurable composition that is curable with light may contain at least a polymerizable compound and a photopolymerization initiator, and may contain a non-polymerizable compound or a solvent if necessary. A non-polymerizable compound is at least one selected from the group of sensitizers, hydrogen donors, internal mold releasing agents, surfactants, antioxidants, polymer components and the like. The composition is given on the substrate in the form of a film by a spin coater or a slit coater. Alternatively, the composition may be given onto the substrate in the form of droplets or islands or films formed by connecting a plurality of droplets using a liquid injection head. A viscosity of the composition (viscosity at 25° C.) is, for example, higher than or equal to 1 mPa·s and equal to or lower than 100 mPa·s. Further, the composition that is cured with heating is called a thermosetting composition.

Although a silicon wafer, for example, is a representative base material for the substrate 1, a material thereof is not limited thereto. For the substrate 1, any one can be arbitrarily selected from those known as a substrate for semiconductor devices formed of aluminum, a titanium-tungsten alloy, an aluminum-silicon alloy, an aluminum-copper-silicon alloy, silicon oxide, and silicon nitride. Further, for the substrate 1, a substrate on which an adhesion layer has been formed through a surface treatment such as a silane coupling treatment, a silazane treatment, or formation of an organic thin film to improve the adhesion property with respect to the composition may be used. Further, although the substrate 1 typically has a diameter of 300 mm, a diameter thereof is not limited thereto.

Light, for example, is used as energy for curing compositions. In this case, the template 11 is formed of a material that transmits such light. The template 11 includes at least one of, for example, glass, quartz, a light transmissive resin such as polymethyl methacrylate (PMMA) or a polycarbonate resin, a transparent metal vapor deposition film, a flexible film, a photocurable film, and a metal film. The flexible film may be, for example, polydimethylsiloxane, or the like. Although the template 11 may be a circle having a diameter greater than 50 mm and smaller than 500 mm, for example, a diameter thereof is not limited thereto. In addition, although a thickness of the template 11 may be equal to or greater than 0.25 mm and less than 2 mm, it is not limited thereto. The composition may be a UV-curable liquid in the case where UV light is used as energy for curing. The composition may be a monomer, for example, an acrylate or a methacrylate.

The processing apparatus 100 may include the processing units 101 and 102 as two processing units, and a control unit (controller) 200. The processing units 101 and 102 each commonly have a substrate stage drive unit 31, a base surface plate 4, a prop 5, and a top board 6, as illustrated in FIG. 1. The processing unit 101 additionally has a substrate stage 2, a dispenser (coating unit) 20, and a light source 21 for application position adjustment (second radiation unit). The processing unit 102 additionally has a substrate stage 3, a template holding unit (mold holding unit) 12, a radiation unit (first radiation unit) 22, and a light source 23 that outputs light for curing a composition (radiated light). The light source 23 of the first example is a solid light source, for example, a UV-LED. Further, although radiation light from the light source 23 (first light) is mainly used to cure the composition, it may be used for purposes other than curing.

The dispenser 20 included in the processing unit 101 disposes or supplies (applies) an uncured (liquid-state) composition on the substrate 1 (a second position). The dispenser 20 may include, for example, a discharge port (nozzle) that discharges a composition. The dispenser 20 supplies a composition on the substrate 1 in a microvolume (e.g., 1 picoliter) using a method such as a piezo jet method or a micro soleroid method. The number of discharge ports provided in the dispenser 20 is not limited to a specific number, and may be one or more. The dispenser 20 has one hundred or more discharge ports, for example. Such multiple discharge ports may be disposed in one or more lines, for example. In addition, the dispenser 20 may include a drive unit to be able to move in the X and Y axis directions or the Z axis direction by having the drive unit operate based on an operation command from the control unit 200.

In addition, the processing unit 102 includes the radiation unit (exposure unit) 22 as a separate body from the template holding unit 12 that brings the template 11 in contact with the composition on the substrate 1 and releases the template from the composition. The radiation unit 22 includes a window unit that allows energy for curing (e.g., light such as UV light) provided from the light source 23 to pass through.

The processing apparatus 100 of the first example has a measurement plate 7 and a spectrometer (a detector) 24 in the processing unit 101. Furthermore, the processing unit 102 has a thermometer (a temperature measuring unit) 25. The thermometer 25 is connected to the light source 23 to measure temperatures of the light source 23. The measurement plate 7 is a plate that is configured as a separate body from the substrate 1, on which a composition is applied to perform spectrometry, and is disposed right above the spectrometer 24. In addition, the measurement plate 7 is disposed on the substrate stage 2. Without being limited thereto, however, it may be disposed at a position other than one on the substrate stage 2 as long as it is within the processing unit 101 (inside the processing apparatus 100). In addition, a glass substrate may be exemplified as an example of the measurement plate 7.

The control unit 200 includes a CPU, a memory (a storage unit), and the like, is configured as at least one computer, and is connected to each of the constituent elements of the processing apparatus 100 via lines. In addition, the control unit 200 comprehensively controls operations, adjustments, and the like of all of the constituent elements of the processing apparatus 100 according to programs stored in the memory. Furthermore, the control unit 200 may be configured to be integrated with another part of the processing apparatus 100 (in a common housing), configured as a separate body from the other parts of the processing apparatus 100 (in another housing), or installed in a different place from the processing apparatus 100 to perform control remotely.

Figure 3:
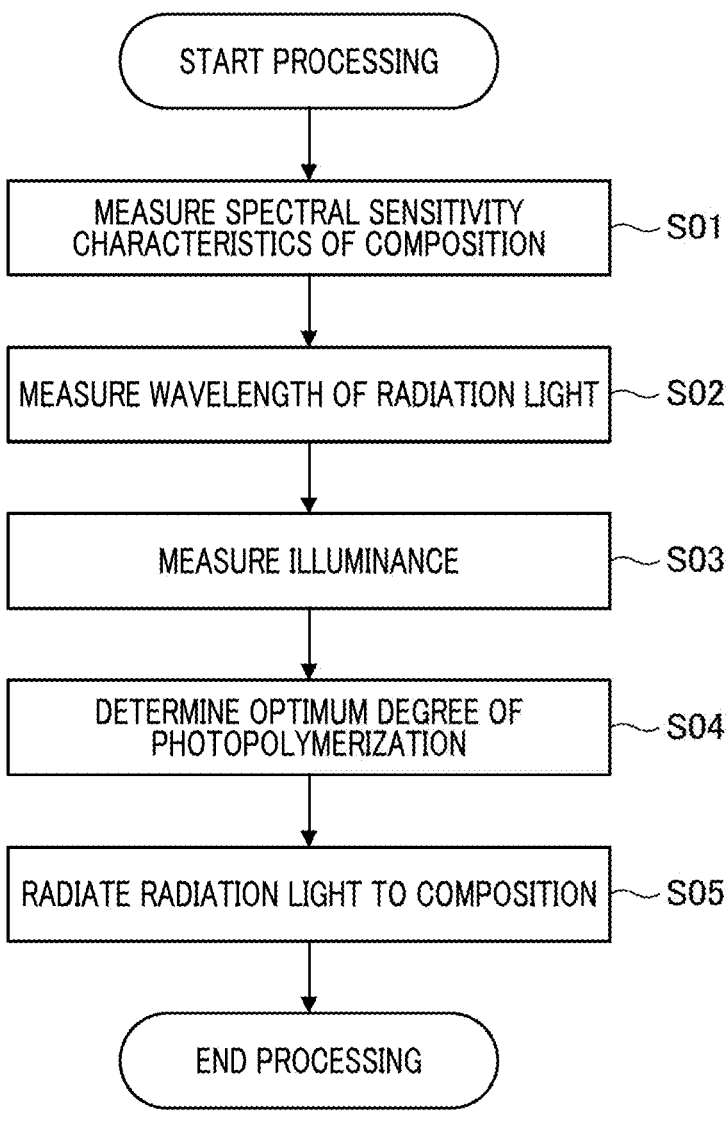
FIG. 3 is a flowchart of a substrate processing method performed by the substrate processing apparatus of the first example.

A method for determining an optimum degree of photopolymerization will be described below with reference to FIG. 3. A degree of photopolymerization is an index indicating a target degree of curing of a composition. FIG. 3 is a flowchart showing an exemplary processing (planarization processing) method performed using the processing apparatus 100 of the first example. Further, each operation (processing) shown in the flowchart of FIG. 3 is controlled by the control unit 200 executing a computer program.

First, spectral sensitivity characteristics of the composition are measured in step S01. Although a timing for measurement is not limited to a particular one, measurement may be performed when the type of a composition is changed, when an application condition such as a film thickness is changed, or the like. The control unit 200 causes measurement results to be stored (saved) in the memory, or the like.

Figure 4:
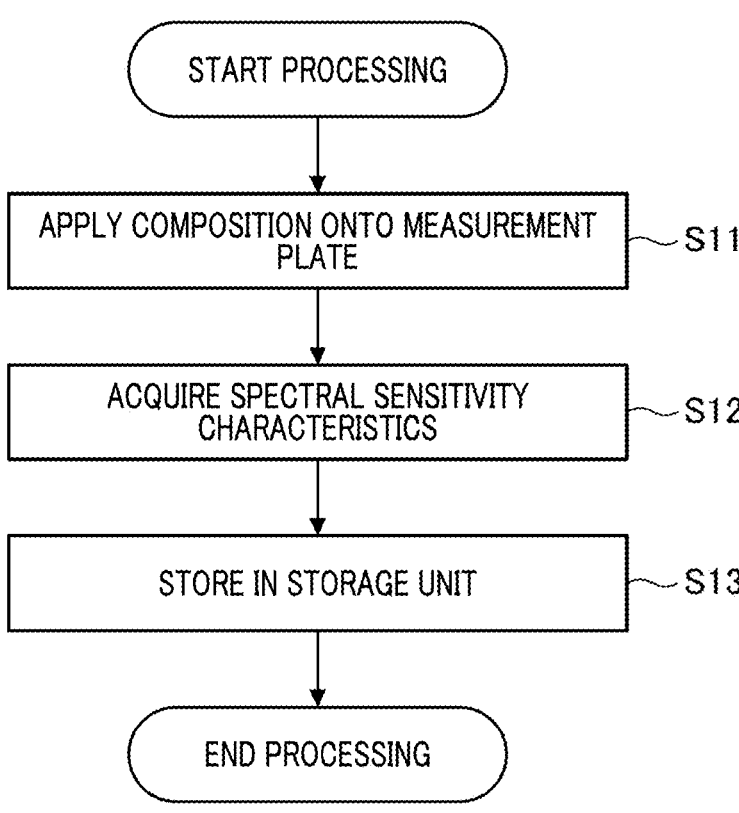
FIG. 4 is a flowchart of a spectral sensitivity measurement method of the first example.

Here, the step of measuring the spectral sensitivity of the composition (the processing of step S01) will be described below in detail with reference to FIG. 4 that is a sub-flow of S01. FIG. 4 is a flowchart showing an exemplary spectral sensitivity measurement method of the first example.

First, in step S11, the control unit 200 controls the dispenser 20 to apply the composition on the measurement plate 7 (a first position). Specifically, the control unit 200 transmits a drive command to the substrate stage drive unit 31 to cause the substrate stage 2 to drive and the measurement plate 7 disposed on the substrate stage 2 to be moved right below the dispenser 20. However, an operation is not limited thereto, for example, a drive command may be transmitted from the control unit 200 to the drive unit of the dispenser 20 to drive the dispenser 20 so that the dispenser 20 is moved right above the measurement plate 7. Then, the composition is applied onto the measurement plate from the dispenser 20 under application conditions similar to those of the planarization processing. After the application is completed, the control unit 200 causes the substrate stage drive unit 31 to drive again to move the measurement plate 7 right below the light source 21 for application position adjustment.

Next, in step S12, spectral sensitivity characteristics of the composition are acquired (measured) using the spectrometer 24. To acquire spectral sensitivity characteristics, first, the light source 21 for application position adjustment is turned on, and the composition applied on the measurement plate 7 is irradiated with light (second light). Some of the light radiated to the composition is absorbed by the composition and acts to cure the composition. Light that has not been absorbed is transmitted through the composition, passes through the measurement plate 7, and then is incident on the spectrometer 24. Further, the spectrometer 24 of the first example has a diffractive element (grating) and an illuminometer (a second illuminance sensor) which are not illustrated. The light incident on the diffractive element is split, is incident on the illuminometer, and thereby the illuminance at each wavelength is measured. Here, the measured illuminance of the wavelength is the transmission illuminance of the composition with respect to the emission illuminance of the light source 21 for application position adjustment.

Figure 5:
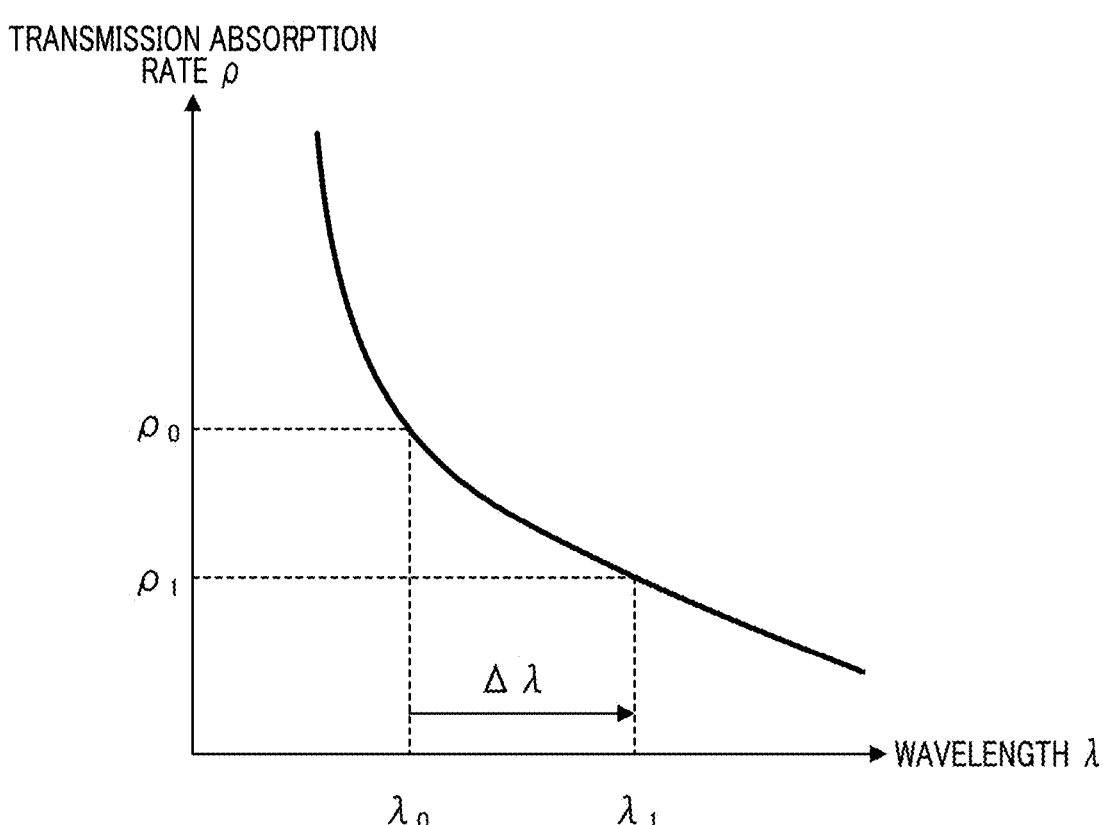
FIG. 5 is a graph showing a transmission absorption rate with respect to a wavelength of light measured in the first example.

In addition, the ratio of the transmission illuminance of the composition with respect to the emission illuminance of the light source 21 for application position adjustment may be calculated by a control unit included in the spectrometer 24, which is not illustrated, to acquire a transmission absorption rate of the composition, that is, spectral sensitivity characteristics of the composition. In addition, FIG. 5 is a diagram illustrating an example of acquired spectral sensitivity characteristics. Spectral sensitivity characteristics of the composition at each wavelength are obtained by setting the horizontal axis shown in FIG. 5 to represent wavelength $\lambda$ and measuring a transmission absorption rate $\rho$ at each wavelength. Further, the emission illuminance of the light radiated from the light source 21 for application position adjustment is measured in advance using the spectrometer 24 before the composition is applied onto the measurement plate 7.

Next, in step S13, the control unit 200 converts the spectral sensitivity characteristics acquired in step S12 into a predetermined form and stores them in the memory or the like. Further, the spectral sensitivity characteristics are acquired (measured) for each type of a composition or each condition under which a composition is applied onto the substrate 1 and stored in association with it.

In step S01 described above, spectral sensitivity characteristics can be acquired immediately after the application of the composition in the processing unit 101. The spectral sensitivity characteristics acquired at that time are spectral sensitivity characteristics of the composition without being affected by a change in the film thickness (thickness) of the composition caused by volatility over time after the composition is applied. In addition, in a case where the processing time from the application of the composition onto the substrate 1 to curing thereof is known in advance, spectral sensitivity characteristics may be acquired in a way that the composition may be applied onto the measurement plate 7 and the characteristics are acquired as described above after the processing time elapses. In this case, there is a time lag between the application of the composition onto the substrate 1 and the curing thereof. By acquiring spectral sensitivity characteristics considering such a time lag, the spectral sensitivity characteristics of the composition at the time of the actual radiation (actual exposure) that is radiation performed in the above-described radiation step can be acquired. In addition, a time table or the like in which multiple processing times are set in advance may be created or set and the spectral sensitivity characteristics may be acquired in the above-described acquisition method based on the time table.

Figure 6:
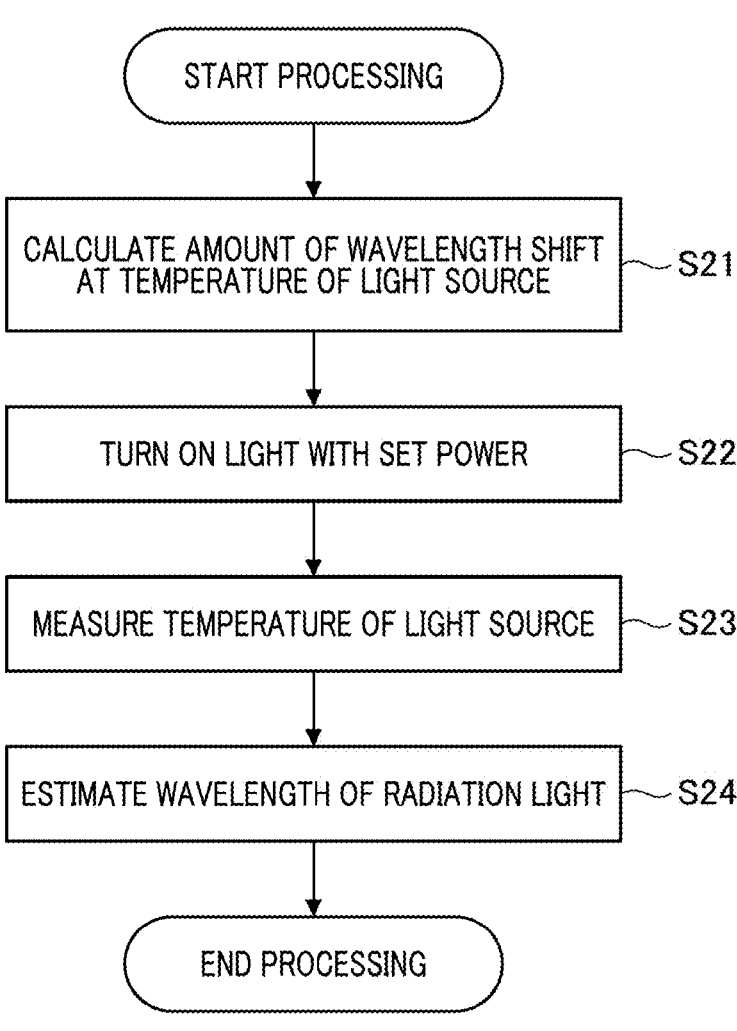
FIG. 6 is a flowchart of a wavelength measurement method for radiated light of the first example.
Figure 7:
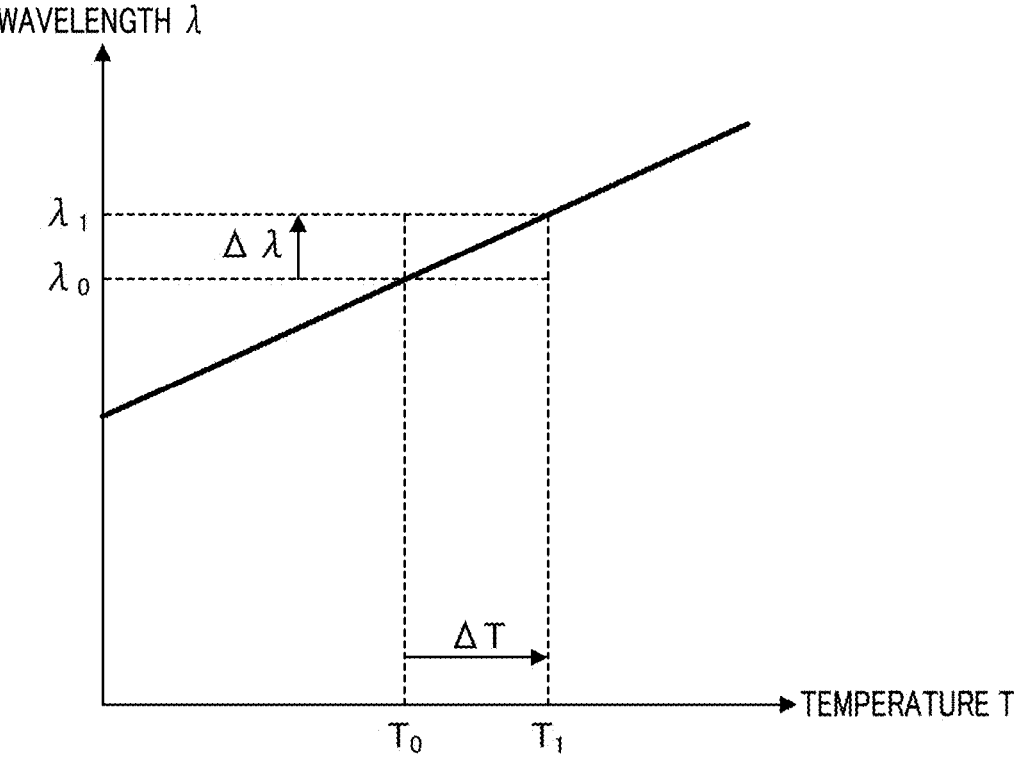
FIG. 7 is a diagram illustrating wavelength characteristics of light at temperatures measured in the first example.

Next, returning to FIG. 3, in step S02, the wavelength of the light radiated from the light source (radiation light source) 23 (radiation light) is measured. Here, the wavelength measurement method of this step will be described in detail with reference to FIG. 6 that is a sub-flow of S02 and FIG. 7 that is a diagram illustrating a relationship between measured wavelengths and temperatures. FIG. 6 is a flowchart showing an exemplary wavelength measurement method for radiation light from the light source 23 of the first example. FIG. 7 is a diagram illustrating exemplary wavelength characteristics of the light at temperatures measured in the first example. Further, a temperature T in FIG. 7 is a temperature of the light source 23 in the first example.

When a temperature of the light source 23 changes, the wavelength (wavelength $\lambda$) of the radiated light (first light) from the light source 23 changes accordingly, as shown in FIG. 7. With respect to the light source 23 having a wavelength $\lambda0$ of light radiated at a reference temperature T0, when an output of the light source 23 is raised, if the temperature of the light source 23 changes by a temperature difference $\Delta T$ $(=T_1-T_0)$, the wavelength of radiated light also changes by $\Delta\lambda$ $(=\lambda_1-\lambda_0)$. Thus, a so-called wavelength shift $\Delta\lambda$ $(=\lambda_1-\lambda_0)$ occurs.

Because the wavelength of radiated light from the light source 23 changes as a temperature of the light source 23 changes as described above, if a wavelength shift $\Delta\lambda$ occurs, it is unlikely that radiation of light to the composition can be performed at a proper wavelength of the radiated light during the above-described radiation step.

For this reason, first in step S21, the control unit 200 measures and acquires a wavelength shift $\Delta\lambda$ with respect to a temperature difference $\Delta T$ in advance. Further, the control unit 200 functions as a wavelength measurement unit when a wavelength shift $\Delta\lambda$ is measured. The measured wavelength shift $\Delta\lambda$ is stored as a wavelength characteristic of the radiated light at the temperature in a memory or the like by the control unit 200. Although the measurement may be performed every time, it may be performed at the time of replacement of the light source 23, or the like. The measurement may be preferably performed in advance before the above-described planarization processing is performed.

Next, in step S22, the control unit 200 turns on the light source 23. The light source 23 is turned on at set power under processing conditions (process conditions) similar to those of the planarization processing.

Next, in step S23, the control unit 200 measures the temperature of the light source 23 being turned on at the set power using the thermometer 25 and then acquires the temperature measurement result (temperature data).

Next, in step S24, the control unit 200 causes the temperature measurement result of step S23 to be stored in the memory or the like. Next, the control unit 200 calculates the wavelength shift $\Delta\lambda$ with respect to the reference wavelength $\Delta\lambda0$ from the temperature measurement result acquired in step S23 based on the wavelength characteristics of the radiated light acquired in step S21. With this operation, an appropriate wavelength of the radiated light from the light source 23 at the time of the above-described radiation step can be estimated.

Next, returning to FIG. 3, in step S03, the control unit 200 measures the amount of light radiated from the light source 23 using the illuminometer (a first illuminance sensor) 26 mounted on the substrate stage 3. The control unit 200 causes the measured amount of light to be stored in the memory or the like.

In step S04, the control unit 200 calculates and determines the optimum degree of photopolymerization for the composition based on the spectral sensitivity result of the composition acquired in step S01, the wavelength of the radiated light from the light source 23 acquired in step S02, and the illuminance result acquired in step S03. Specifically, a rate of change in spectral sensitivity at the wavelength of the radiated light during the actual radiation is estimated from the wavelength of the radiated light during the actual radiation and the spectral sensitivity characteristics of the composition. Furthermore, in addition to the determination of the optimum degree of photopolymerization, the control unit 200 calculates an optimum amount of radiation for the composition based on the determined optimum degree of photopolymerization.

If the wavelength shift $\Delta\lambda$ shown in FIG. 7 is applied to the spectral sensitivity characteristics shown in FIG. 5, a spectral sensitivity change rate $\Delta\rho = \rho_1/\rho_0$ according to the wavelength shift is obtained. The control unit 200 may correct the current degree of photopolymerization $PD_0$ considering the spectral sensitivity change rate $\Delta\rho$ to calculate and determine the optimum degree of photopolymerization $PD_1$ for the composition.

In step S05, the control unit 200 controls the dispenser 20 such that the composition is applied onto the substrate 1. Then, the control unit 200 controls an amount of radiated light from the light source 23 based on the optimum degree of photopolymerization $PD_1$ determined in step S04 such that the composition is irradiated with (exposed to) the radiated light from the light source 23 and the composition is cured. With this operation, the composition can be in an optimum curing state.

In the first example described above, spectral sensitivity characteristics of the composition are measured, the optimum degree of photopolymerization $PD_1$ is determined, and then the dispenser 20 applies the composition on the substrate 1. Then, while the template 11 is in contact with the composition on the substrate 1, the amount of radiation light from the light source 23 is controlled such that the cured composition state becomes optimum based on the optimum degree of photopolymerization $PD_1$, and then light is radiated from the light source 23 to the composition. With this operation, the composition can be in an (optimum) curing state expected for curing of the composition, that is, to a target degree of curing of the composition.

In addition, for the control unit 200 to control an amount of radiation light from the light source 23, methods for changing the radiation time $t_0$ of the radiation light from the light source 23 or changing a light illuminance intensity (emission intensity) of the radiation light from the light source 23 are exemplified. Furthermore, as a method of changing an input power value for the light source 23 to increase an illuminance $I_0$, the amount of radiation light from the light source 23 may be controlled. A radiation time $t_1$ considering the spectral sensitivity change rate $\Delta\rho$ can be expressed with the following formula (2).

[Equation 2]

$$t_1 = t_0 / \Delta\rho \tag{2}$$

At this time, the optimum degree of photopolymerization $PD_1$ can be expressed with the following formula (3).

[Equation 3]

$$PD_1 = k \times (\sqrt{I_0}) \times t_1 \tag{3}$$

Here, it is highly likely that the temperature of the light source 23 changes if the input power value of the light source 23 changes. For this reason, it is preferable for the control unit 200 to control the amount of radiation light from the light source 23 by changing the radiation time $t_0$. Examples of the method for changing the radiation time in the first example include a method of changing a time in which the LED is turned on or a method of changing the radiation time using the shutter (e.g., the exposure shutter).

According to the first example, the processing apparatus 100 that can control an amount of light to be radiated to the composition based on the optimum degree of photopolymerization and radiate light to the composition in an optimum radiation amount without being affected by a change in a radiation wavelength caused by a change in temperature of the light source 23 as described above can be provided.

In addition, in a case of a lithography apparatus, for example, an imprinting apparatus, the control unit 200 first applies a composition on the substrate 1. Then, the pattern of the template 11 is brought in contact with the pattern formation area in which the composition is applied onto the substrate 1 with the template 11 held by the template holding unit 12. After the contact, radiation light from the light source 23 (first light) is radiated to the composition to cure it. After the composition is cured, the template 11 is released from the composition. The series of operations is repeated for each of multiple pattern formation areas. At this time, the amount of radiation light from the light source 23 with respect to the composition applied to each of the pattern formation areas may be controlled based on the above-described optimum degree of photopolymerization PD1.

In addition, by measuring the spectral sensitivity characteristics of the composition in the processing unit 102 in-situ, the spectral sensitivity characteristics of the composition can be acquired under the same application conditions as those for the planarization processing. Furthermore, because steps S01, S02, and S03 shown in FIG. 3 are performed in the different processing units as described above, they may be performed in parallel as shown in FIG.

Figure 8:
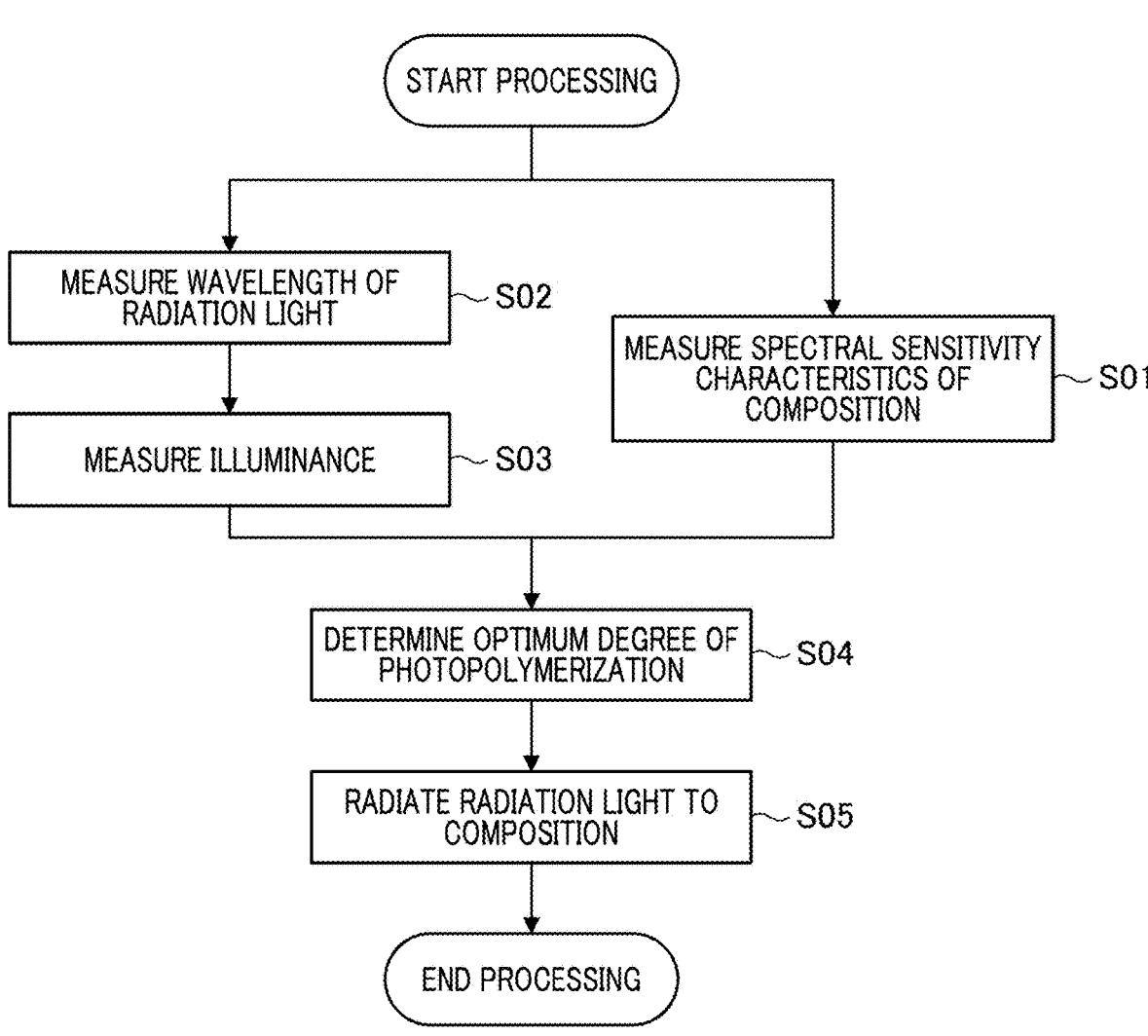
FIG. 8 is a flowchart of the substrate processing method performed by the substrate processing apparatus of the first example.

8. FIG. 8 is a flowchart showing an exemplary substrate processing method in the case where the processing units 101 and 102 perform processing in parallel. Further, because the processing method shown in FIG. 3 is similar to that of FIG. 8, description thereof will be omitted. Further, in a case where the processing shown in FIG. 8 is performed, the processing unit 101 performs the step S01, and the processing unit 102 performs the steps S02 and S03 in parallel or in conjunction therewith. Then steps S04 and S05 are performed in a manner similar to the processing method of FIG. 1.

Second Embodiment

Figure 9:
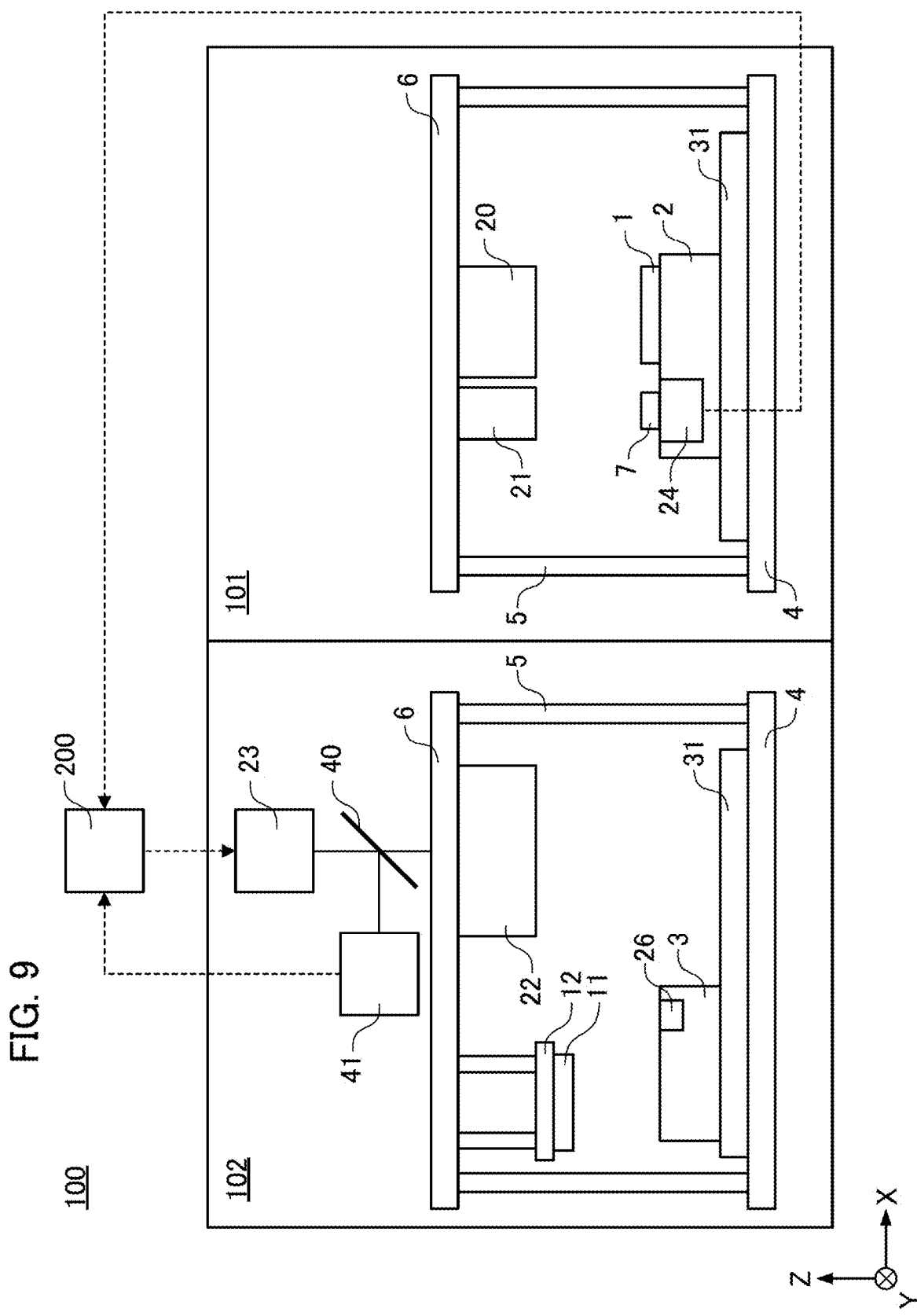
FIG. 9 is a diagram illustrating a configuration of a substrate processing apparatus of a second example.

FIG. 9 is a diagram illustrating a processing apparatus 100 according to a second example. The second example is characteristic in that a beam splitter 40 and a spectrometer 41 included in a processing unit 102 acquire wavelength characteristics of radiation light from a light source 23. Further, because the second example has a configuration similar to that of the processing apparatus 100 of the first example except that the beam splitter 40 and the spectrometer 41 are included in the processing unit 102, description of the similar point will be omitted, and only differences will be described below.

In the second example, part of radiation light from the light source 23 is cut out using the beam splitter 40 and guided to the spectrometer 41 as illustrated in FIG. 9. The spectrometer 41 has a configuration similar to that of the spectrometer 24, and can measure wavelength characteristics of radiation light from the light source 23. Wavelength characteristics of radiation light from the light source 23 can be directly measured by using the spectrometer 41. The measurement result obtained after the wavelength characteristics of the radiation light from the light source 23 are measured using the spectrometer 41 is stored in a memory or the like by a control unit 200.

Because the wavelength characteristics of radiation light from the light source 23 are directly measured as described above in the second example, the thermometer 25 provided in the first example is unnecessary and there is no need to estimate the wavelength of radiation light from the light source 23 based on a temperature. Thus, the processing apparatus 100 that can simplify calculation of an optimum degree of photopolymerization can be provided. Furthermore, as in the first example, the processing apparatus 100 that can control an amount of light to be radiated to a composition based on the optimum degree of photopolymerization and radiate light to the composition in an optimum radiation amount can be provided.

Third Embodiment

Figure 10:
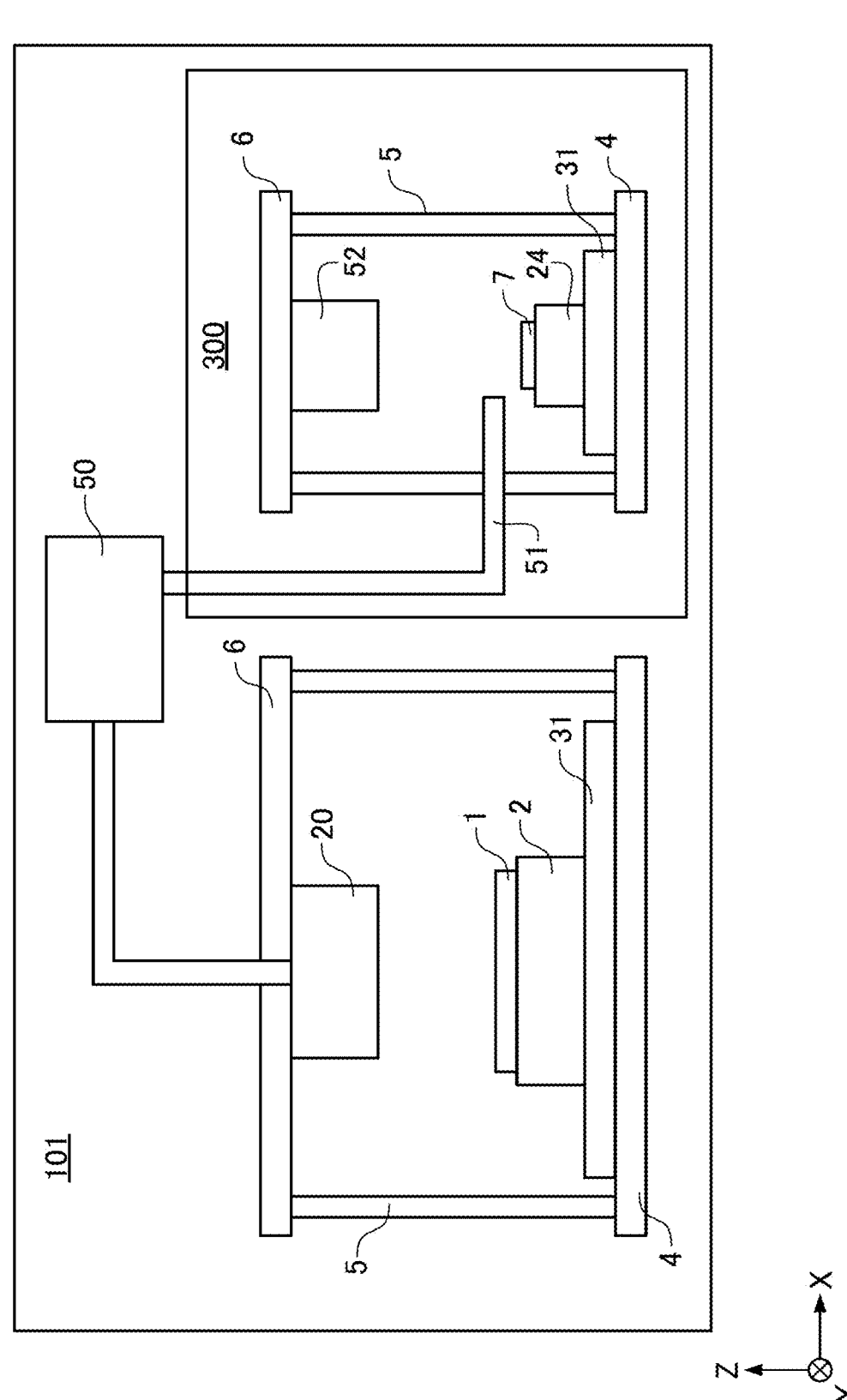
FIG. 10 is a diagram illustrating a configuration of a processing unit of a substrate processing apparatus of a third example.

FIG. 10 is a diagram illustrating a processing unit 101 of a processing apparatus 100 according to a third example. In the third example, the spectrometer 24 mounted on the substrate stage 2 in the second example is provided as a spectroscopy unit 300 at a different position from the substrate stage 2. Further, because the third example has a configuration similar to that of the processing apparatus 100 of the first example except that the spectrometer 24 mounted on the substrate stage 2 is configured as the spectroscopy unit 300, description of similar points will be omitted and only differences will be described below.

The spectroscopy unit 300 has a configuration similar to that of the spectrometer 24 of the first example. The spectroscopy unit 300 may be configured as a part of the processing unit 101 as illustrated in FIG. 10. Furthermore, the spectroscopy unit 300 may be disposed at a position separate from the processing unit 101, that is, outside the processing unit 101.

A dispenser 20 is connected to a composition tank 50 and receives supply of a composition from the composition tank 50. The composition tank 50 has a discharge nozzle 51, and the discharge nozzle 51 is guided to the spectroscopy unit 300. The spectroscopy unit 300 has a measurement light source 52 for UV wavelengths.

To acquire spectral sensitivity characteristics of a composition, the composition from the discharge nozzle 51 is applied onto a measurement plate 7 in the third example. When the composition applied onto the measurement plate 7 is irradiated using the measurement light source 52 and spectroscopy is performed using the spectrometer 24, spectral sensitivity characteristics of the composition can be measured. Further, the method for acquiring spectral sensitivity characteristics, calculation of an optimum degree of photopolymerization, and the like are similar to those of the first example. A control unit 200 causes the acquired results of the spectral sensitivity measurement to be stored in a memory, or the like.

In the third example, by providing the spectroscopy unit 300 at a different position from the substrate stage 2 as described above, the processing apparatus 100 in which the spectroscopy unit 300 can be retrofitted to the existing processing unit 101 can be provided. Furthermore, as in the first example, the processing apparatus 100 that can control an amount of light to be radiated to a composition based on the optimum degree of photopolymerization and radiate light to the composition in an optimum radiation amount can be provided.

Embodiment of Article Manufacturing Method

An article manufacturing method according to an example is preferable for manufacturing, for example, a microdevice such as a semiconductor device, an element having a microstructure, and the like. The article manufacturing method according to the example includes a step of forming a pattern on a composition applied onto a substrate using the above-described processing apparatus 100 (a step of processing a substrate) and a step of processing the substrate on which the pattern has been formed in the aforementioned step. Furthermore, the manufacturing method includes other known steps (oxidation, film formation, vapor deposition, doping, planarization, etching, composition separation, dicing, bonding, packaging, etc.). The article manufacturing method according to the example is advantageous in at least one of performance, quality, productivity, and production cost of an article, compared to methods of the related art.

Patterns of cured materials molded using the processing apparatus 100 are permanently used at least some of various articles or temporarily used when various articles are manufactured. An article is an electric circuit element, an optical element, an MEMS, a recording element, a sensor, a mold, or the like. Examples of electric circuit element include a volatile or a non-volatile semiconductor memory such as a DRAM, an SRAM, a flash memory, or an MRAM, a semiconductor element such as an LSI, a CCD, an image sensor, or an FPGA, and the like. Examples of mold include a mold for substrate processing such as imprinting, and the like.

Such patterns of cured materials may be used as they are as a constituent material of at least a part of the article or temporarily used as a composition mask. The composition mask is removed after etching, ion implantation, and the like are performed in the substrate processing step.

Figure 11A:
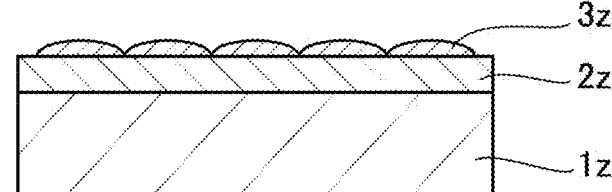
FIGS. 11A to 11F are schematic diagrams for describing an article manufacturing method.

Next, the article manufacturing method will be described in detail with reference to FIG. 11. A substrate 1z such as a silicon substrate with a surface on which a work material 2z such as an insulator is formed is provided and then a composition 3z is applied onto a surface of the work material 2z using in ink jet method or the like as illustrated in FIG. 11A. Here, a state in which the composition 3z in multiple droplets is applied onto the substrate 1z is illustrated.

Figure 11B:
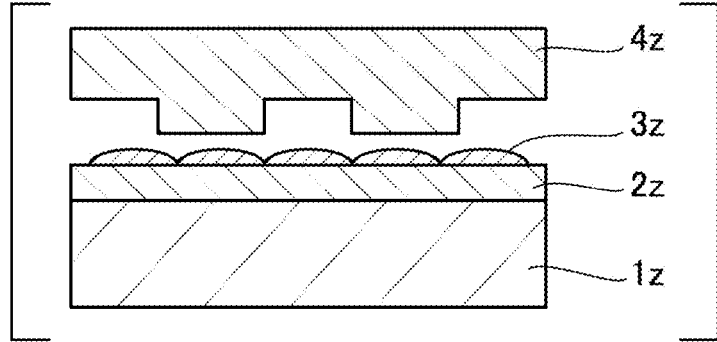
Figure 11C:
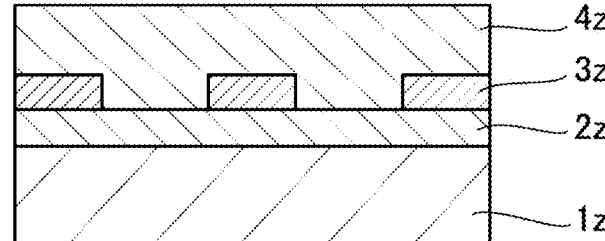

A concave/convex pattern on a side of a mold 4z is made to face the composition 3z on the substrate 1z as illustrated in FIG. 11B. The mold 4z is brought in contact with the substrate 1z onto which the composition 3z has been applied as illustrated in FIG. 11C and pressure is imparted thereto (a contact step). The gap between the mold 4z and the work material 2z is filled with the composition 3z. Light as energy for curing is radiated through the mold 4z in that state to cure the composition 3z (a curing step). At this time in the embodiment, light can be radiated to the composition in an optimum radiation amount based on acquired spectral sensitivity characteristics, and thus a degree of polymerization can be optimized.

Figure 11D:
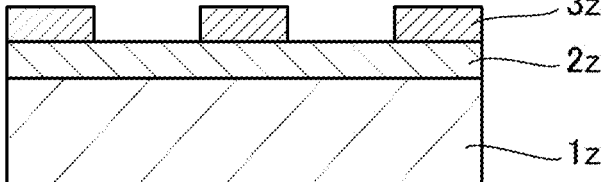

When the mold 4z is released from the substrate 1z after the composition 3z is cured, the pattern of the cured material of the composition 3z is formed on the substrate 1z as illustrated in FIG. 11D (a pattern formation step or molding step). The pattern of the cured material has the shape in which the concavity of the mold 4z corresponds to the convexity of the cured material and the convexity of the mold 4z corresponds to the concavity of the cured material, that is, the concave/convex pattern of the mold 4z is transferred to the composition 3z.

Figure 11E:
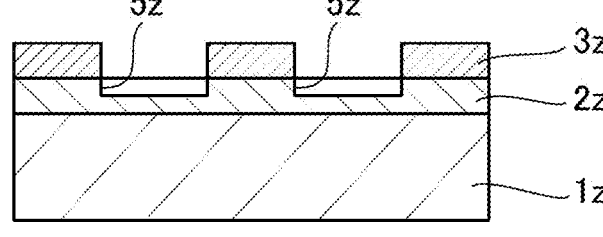
Figure 11F:
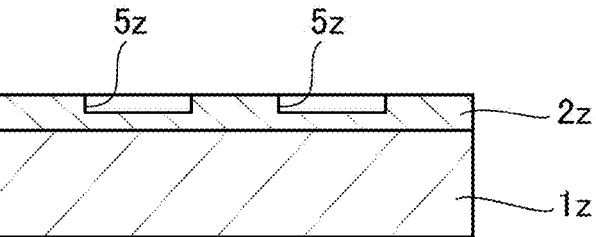

When etching is performed using the pattern of the cured material as an etching resistance mask, the portion on the surface of the work material 2z with no cured material or with a remaining thin cured material is removed, and grooves 5z are formed as illustrated in FIG. 11E. When the pattern of the cured material is removed, an article with the grooves 5z formed on the surface of the work material 2z can be obtained as illustrated in FIG. 11F. Although the pattern of the cured material is removed here, it may not be removed after the processing and may be used as, for example, an interlayer insulating film included in a semiconductor element or the like, that is, a constituent member of an article. Further, although the example in which a mold for circuit pattern transfer with a concave/convex pattern is used as the mold 4z has been described, a plane template having a plane part without a concave/convex pattern may be used.

In addition, a computer program for realizing the functions of the above-described examples for part of or the entire control of the above-described examples may be supplied to the processing apparatus 100 and the like via a network or various storage media. In addition, a computer (a CPU, an MPU, or the like) of the processing apparatus 100 or the like may read and execute the program. In this case, the program and the storage medium storing the program constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. No. 2021-081858, May 13, 2021, which is hereby incorporated by reference wherein in its entirety.

What is claimed is:

1. A substrate processing apparatus configured to perform pattern formation processing on a composition on a substrate, the substrate processing apparatus comprising:
   a first radiation unit configured to radiate first light onto the substrate;
   a dispenser configured to apply the composition to a first position inside the substrate processing apparatus;
   a template holding unit configured to hold a template to be brought in contact with the composition on the substrate; and
   a controller configured to control a radiation amount of the first light to be radiated by the first radiation unit based on spectral sensitivity characteristics, which are measured by a spectrometer, of the composition applied to the first position by the dispenser,
   wherein the dispenser applies the composition to the first position, which is on a measurement plate disposed on a substrate stage configured to move while holding the substrate.

2. The substrate processing apparatus according to claim 1, further comprising:
   the spectrometer,
   wherein the controller controls the radiation amount of the first light radiated from the first radiation unit based on the spectral sensitivity characteristics of the composition measured by the spectrometer.

3. The substrate processing apparatus according to claim 2, wherein:
   a second radiation unit radiates second light to the composition applied to the first position,
   the spectrometer measures light from the composition, and then acquires the spectral sensitivity characteristics of the composition.

4. The substrate processing apparatus according to claim 3, further comprising an illuminance sensor configured to measure an illuminance of the first light.

5. The substrate processing apparatus according to claim 2, wherein the spectrometer includes:
   a diffractive element configured to split light from the composition; and
   an illuminance sensor configured to measure an illuminance of light split by the diffractive element.

6. The substrate processing apparatus according to claim 2, wherein, after the spectrometer measures the spectral sensitivity characteristics of the composition, the controller causes:
   the dispenser to apply the composition to a second position on the substrate; and then
   the first radiation unit to radiate the first light to the composition while bringing a mold in contact with the composition applied to the second position.

7. The substrate processing apparatus according to claim 6, wherein, after the composition is applied to the second position on the substrate, the controller brings the mold in contact with each of a plurality of areas of the composition at the second position, then repeats an operation of radiating the first light, and controls the radiation amount of the first light to be radiated to the composition for each of the areas.

8. The substrate processing apparatus according to claim 1, further comprising a planarization apparatus configured to form a planarized pattern using the composition on the substrate by bringing a planarized surface of a mold in contact with the composition on the substrate.

9. The substrate processing apparatus according to claim 1, wherein the first light is for curing the composition.

10. A substrate processing apparatus configured to perform pattern formation processing on a composition on a substrate, the substrate processing apparatus comprising:

a radiation unit configured to radiate light onto the substrate;

a dispenser configured to apply the composition to a position inside the substrate processing apparatus;

a template holding unit configured to hold a template to be brought in contact with the composition on the substrate; and a controller configured to:

control a radiation amount of the light to be radiated by the radiation unit based on spectral sensitivity characteristics, which are measured by a spectrometer, of the composition applied to the position by the dispenser; and measure wavelength characteristics of the light of the radiation unit.

11. The substrate processing apparatus according to claim 10, wherein the controller controls the radiation amount of the light based on the wavelength characteristics of the light.

12. A substrate processing apparatus configured to perform pattern formation processing on a composition on a substrate, the substrate processing apparatus comprising:

a radiation unit configured to radiate light onto the substrate;

a dispenser configured to apply the composition to a position inside the substrate processing apparatus;

a template holding unit configured to hold a template to be brought in contact with the composition on the substrate; and a controller configured to control:

a radiation amount of the light to be radiated by the radiation unit based on spectral sensitivity characteristics, which are measured by a spectrometer, of the composition applied to the position by the dispenser; and at least one of a light illuminance intensity of the light of the radiation unit or a radiation time in which the light is radiated to the composition.

13. An article manufacturing method that is performed using a substrate processing apparatus including a radiation unit configured to radiate light onto a substrate, a dispenser configured to apply the composition to a position inside the substrate processing apparatus, a template holding unit configured to hold a template to be brought in contact with the composition on the substrate, and a controller configured to control a radiation amount of the light to be radiated by the radiation unit based on spectral sensitivity characteristics, which are measured by a spectrometer, of the composition applied to the position by the dispenser, and wherein the dispenser applies the composition to the position, which is on a measurement plate disposed on a substrate stage configured to move while holding the substrate, the article manufacturing method comprising:

a pattern formation step of forming a pattern on the substrate;

a processing step of processing the substrate on which the pattern has been formed in the pattern formation step; and a step of manufacturing an article from the substrate processed in the processing step.

* * * * *